United States Patent
Shaw

(10) Patent No.: US 9,487,951 B2
(45) Date of Patent: Nov. 8, 2016

(54) ARCHITECTURAL CONCRETE WALL AND METHOD OF FORMING THE SAME

(71) Applicant: SHAW & SONS, INC., Costa Mesa, CA (US)

(72) Inventor: Ronald Shaw, Corona Del Mar, CA (US)

(73) Assignee: Shaw & Sons, Inc., Costa Mesa, CA (US)

(*) Notice: Subject to any disclaimer, the term of this patent is extended or adjusted under 35 U.S.C. 154(b) by 0 days.

(21) Appl. No.: 14/923,880

(22) Filed: Oct. 27, 2015

(65) Prior Publication Data

US 2016/0047121 A1 Feb. 18, 2016

Related U.S. Application Data

(63) Continuation of application No. 14/505,412, filed on Oct. 2, 2014, now abandoned, which is a continuation of application No. 13/782,858, filed on Mar. 1, 2013.

(51) Int. Cl.

| | |
|---|---|
| *E04B 2/84* | (2006.01) |
| *E04F 13/02* | (2006.01) |
| *E04F 21/04* | (2006.01) |
| *C04B 28/02* | (2006.01) |
| *C04B 40/02* | (2006.01) |
| *C04B 111/00* | (2006.01) |

(52) U.S. Cl.
CPC ............... *E04B 2/845* (2013.01); *C04B 28/02* (2013.01); *C04B 40/0295* (2013.01); *E04B 2/84* (2013.01); *E04F 13/02* (2013.01); *E04F 21/04* (2013.01); *C04B 2111/00146* (2013.01); *E04B 2/842* (2013.01)

(58) Field of Classification Search
CPC .......... E04F 13/02; E04F 21/04; E04B 1/16; E04B 1/163; E04B 1/165; E04B 2/845; E04B 2/8658; B28B 1/29; B28B 1/32; B28B 11/089
See application file for complete search history.

(56) References Cited

U.S. PATENT DOCUMENTS

| | | |
|---|---|---|
| 348,443 A | 8/1886 | Anderson |
| 418,840 A | 1/1890 | Hettich |
| 712,168 A | 10/1902 | Worth |
| 738,704 A | 9/1903 | Semmer |
| 745,068 A | 11/1903 | Menezarski |
| 763,064 A | 6/1904 | Mercer |

(Continued)

FOREIGN PATENT DOCUMENTS

WO WO8501690 4/1985

OTHER PUBLICATIONS

Steam Cleaning Concrete, Dec. 15, 2003, http://www.repair-home.com?Steam_Cleaning_Concrete.html.

(Continued)

*Primary Examiner* — Christine T Cajilig
(74) *Attorney, Agent, or Firm* — Stetina Brunda Garred and Brucker

(57) ABSTRACT

Provided is a method of forming an architectural concrete wall. The method includes conveying a concrete mixture onto a base surface and floating the concrete mixture. The method further includes providing an elongate irregular surface forming tool having a gripping portion and a distressing portion defining an irregular configuration. The exposed surface is repeatedly struck with the distressing portion of the irregular surface forming tool to define an irregular surface.

20 Claims, 3 Drawing Sheets

(56) References Cited

U.S. PATENT DOCUMENTS

| | | | |
|---|---|---|---|
| 821,277 A | 5/1906 | Bellars | |
| 828,031 A | 8/1906 | Kemper | |
| 830,747 A | 9/1906 | Stauffer | |
| 836,369 A | 11/1906 | Dexter | |
| 958,194 A | 5/1910 | Thomas | |
| 967,836 A | 8/1910 | Rodham | |
| 969,345 A | 9/1910 | Adamson | |
| 1,359,893 A | 11/1920 | Hopkins | |
| 1,394,678 A | 11/1921 | DePaoli | |
| 1,534,353 A | 4/1925 | Besser | |
| 1,564,810 A | 12/1925 | Angulo | |
| 2,021,210 A | 11/1935 | Thorn | |
| 2,045,482 A | 6/1936 | Maier | |
| 2,101,540 A | 12/1937 | Gullich | |
| RE20,985 E | 1/1939 | Knight | |
| 2,266,510 A | 12/1941 | Pottinger | |
| 2,381,613 A | 8/1945 | Mitchell | |
| 2,493,826 A | 1/1950 | Oelfke et al. | |
| 2,643,539 A * | 6/1953 | Bouch | E04F 13/02 52/302.3 |
| 2,907,129 A | 10/1959 | Bedell | |
| 2,931,751 A | 4/1960 | Du Fresne | |
| 3,154,830 A | 11/1964 | Juchniewicz | |
| 3,319,392 A | 5/1967 | Fitzgerald | |
| 3,616,103 A | 10/1971 | Greiner et al. | |
| 3,646,715 A | 3/1972 | Pope | |
| 3,744,194 A | 7/1973 | Ramberg | |
| 3,874,140 A | 4/1975 | Seehusen | |
| 4,070,849 A | 1/1978 | DiGiacomo | |
| 4,076,875 A | 2/1978 | Van Gasse | |
| 4,175,639 A | 11/1979 | Wirt | |
| 4,205,040 A | 5/1980 | Aoyama | |
| 4,253,288 A | 3/1981 | Chun | |
| 4,270,789 A | 6/1981 | Cline | |
| 4,366,942 A | 1/1983 | Michienzi | |
| 4,472,919 A | 9/1984 | Nourse | |
| 4,565,661 A | 1/1986 | Michienzi | |
| 4,571,914 A | 2/1986 | Stoyanoff | |
| 4,678,157 A | 7/1987 | Fondiller | |
| 4,748,788 A | 6/1988 | Shaw | |
| 4,864,792 A | 9/1989 | Andre et al. | |
| 4,947,600 A | 8/1990 | Porter | |
| 5,133,915 A | 7/1992 | Metten et al. | |
| 5,196,248 A | 3/1993 | Danico et al. | |
| 5,246,650 A | 9/1993 | Clark | |
| 5,268,137 A | 12/1993 | Scott et al. | |
| 5,492,434 A | 2/1996 | Adams et al. | |
| 5,673,489 A | 10/1997 | Robell | |
| 5,735,094 A | 4/1998 | Zember | |
| 5,794,401 A | 8/1998 | Shaw | |
| 5,887,399 A | 3/1999 | Shaw | |
| 5,950,394 A | 9/1999 | Shaw | |
| 6,016,635 A | 1/2000 | Shaw | |
| 6,033,146 A | 3/2000 | Shaw | |
| 6,071,458 A | 6/2000 | Mossi | |
| 6,082,074 A | 7/2000 | Shaw | |
| 6,112,487 A | 9/2000 | Shaw | |
| 6,164,037 A | 12/2000 | Passeno | |
| 6,330,774 B1 | 12/2001 | Weinstein | |
| 6,390,801 B1 | 5/2002 | Smith | |
| 6,561,786 B2 | 5/2003 | Ciccarello | |
| 6,575,727 B2 | 6/2003 | Ciccarello et al. | |
| 6,609,340 B2 | 8/2003 | Moore et al. | |
| 6,630,041 B1 | 10/2003 | Reiber | |
| 6,785,992 B2 | 9/2004 | Chiarucci | |
| 6,803,002 B2 | 10/2004 | Suto et al. | |
| 6,834,438 B1 | 12/2004 | Heister | |
| 6,843,947 B2 | 1/2005 | Ciccarello et al. | |
| 6,907,708 B2 | 6/2005 | Naji et al. | |
| 6,955,834 B2 | 10/2005 | Rohrbaugh et al. | |
| 7,242,799 B1 | 7/2007 | Bremsteller | |
| 7,493,732 B2 | 2/2009 | Brailsford et al. | |
| 7,622,155 B1 | 11/2009 | Pace | |
| 7,685,691 B2 | 3/2010 | Jecker | |
| 7,744,961 B1 * | 6/2010 | Pace | C04B 28/02 427/356 |
| 8,006,451 B2 | 8/2011 | Bond | |
| 8,528,153 B1 * | 9/2013 | Hogan | E04F 21/04 15/235.4 |
| 8,672,580 B1 * | 3/2014 | Garceau | E01C 19/508 404/75 |
| 2002/0145224 A1 | 10/2002 | Ciccarello | |
| 2002/0148195 A1 | 10/2002 | Ward | |
| 2003/0061722 A1 | 4/2003 | Bradley | |
| 2003/0173697 A1 | 9/2003 | Ciccarello et al. | |
| 2005/0051041 A1 * | 3/2005 | Gregg | E01C 19/43 101/110 |
| 2005/0172947 A1 | 8/2005 | Pedersen et al. | |
| 2006/0083591 A1 | 4/2006 | Shaw | |
| 2006/0180507 A1 | 8/2006 | DeHart et al. | |
| 2006/0180731 A1 | 8/2006 | Scott et al. | |
| 2007/0071550 A1 | 3/2007 | Shaw et al. | |
| 2007/0071551 A1 | 3/2007 | Shaw et al. | |
| 2007/0086860 A1 | 4/2007 | Shaw et al. | |
| 2007/0101677 A1 | 5/2007 | Brailsford et al. | |
| 2007/0104538 A1 | 5/2007 | Shaw et al. | |
| 2009/0145046 A1 | 6/2009 | Thoeny | |
| 2010/0180528 A1 * | 7/2010 | Shaw | E04F 15/12 52/311.1 |
| 2011/0056165 A1 | 3/2011 | Charles, Jr. | |

OTHER PUBLICATIONS

Cement and Concrete Basics, Aug. 22, 2004, http://www.cement.org/basics/concretebasics_placing.asp.

* cited by examiner

ARCHITECTURAL CONCRETE WALL AND METHOD OF FORMING THE SAME

CROSS-REFERENCE TO RELATED APPLICATIONS

The present application is a continuation patent application of U.S. patent application Ser. No. 14/505,412 filed on Oct. 2, 2014, which is a continuation patent application of U.S. patent application Ser. No. 13/782,858 filed on Mar. 1, 2013, the entire contents of which are incorporated herein by reference.

STATEMENT RE: FEDERALLY SPONSORED RESEARCH/DEVELOPMENT

Not Applicable

BACKGROUND

1. Field of the Invention

The present invention relates in general to concrete products and more particularly to a method for creating an irregular aesthetic surface on a concrete wall by using a irregular surface forming tool to impart the irregular surface on the concrete product.

2. Description of the Related Art

As is well known in the building and construction trade, concrete is extensively utilized as a building material for industrial, commercial and residential applications. Due to its durability, water resistance, and cost economy, concrete has gained wide spread use. With this widespread use, the public is currently demanding variations in color, surface texture and overall appearance of concrete so that the concrete possesses improved aesthetics similar to more conventional and costly surfaces such as stone, mosaic, and terrazzo.

In order to meet this demand, the concrete trade has developed various coloring and surface finishing techniques to enhance the aesthetics of concrete. Examples of such finishing techniques include salt finish, multiple broom finish, form press finish (e.g. stamped concrete), and exposed aggregate finish.

Conventional concrete is typically shaped using a form. In some instances, the form defines an enclosure within which the concrete is poured and hardens, after which time the form may be removed. Conventional concrete generally defines a high slump, and will typically not retain its shape shortly after it is poured. As such, the face form maintains the conventional concrete in the desired shape until the concrete sets up and hardens.

Since the concrete generally fills the space/cavity defined by the form, the resultant concrete structure generally assumes the shape of the cavity defined by the form. In some instances, the front exposed surface of the concrete structure may define a shape that is complimentary to the form. For instance, in the case of a vertical wall, the exposed surface of the wall generally defines a shape that is complimentary to the shape of the face-form which covers the front surface during formation of the wall. In the case of a generally horizontal concrete structure, such as a sidewalk, the exposed surface may not be shaped by the form, since the upper surface thereof typically remains exposed during formation of the concrete structure. Instead, the upper surface may be shaped by a stamp or template that is pressed into the upper surface to define the desired shape.

Although conventional concrete defines a high slump, other forms of concrete are also commonly used, which define a low slump. The low slump of various concrete products allows the concrete to generally retain its shape after it is conveyed onto a base surface. Examples of such concrete include Shotcrete, Gunite, and the like. Since low slump concrete products generally retain their shape after being conveyed onto a base surface, a face form is typically not used.

As noted above, the face form may serve a dual function of retaining conventional concrete while it hardens, while also defining a certain shape or texture to the concrete. However, when a face form is not used, such shapes or surface patterns may not be defined within the concrete products, such as Shotcrete, Gunite or the like.

Therefore, there exists a need in the art for method of creating a particular texture or irregular surface in concrete structures formed from Shotcrete, Gunite, or similar concrete materials. Various aspects of the present invention are directed toward addresses this particular need, as will be discussed in more detail below.

BRIEF SUMMARY

According to various aspects of the present invention, there is provided a method of forming an architectural concrete wall. The method includes conveying a concrete mixture onto a base surface, wherein the concrete mixture defines an exposed surface, which is floated. The method further includes providing an elongate irregular surface forming tool, such as a chain, having a gripping portion and a distressing portion defining an irregular configuration. The exposed surface is repeatedly struck at random locations with the distressing portion of the irregular surface forming tool to define an irregular surface.

Various aspects of the present method allow for the creation of an irregular surface within concrete products which are typically constructed without a face form, such as structures formed with Shotcrete, Gunite, or the like. The irregular surface produced by the present method may give the appearance of a distressed or worn surface. The distressed or warn appearance achieved by the present method may be an aesthetically pleasing look without mitigating the structural soundness or integrity of the architectural wall.

The method may additionally include the steps of providing a stamp and pressing the stamp against the irregular surface to impart a stamped texture or design into the irregular surface.

The conveying step may include pneumatically projecting the concrete mixture onto the base surface with a hose.

The method may additionally include the step of constructing a back-form, which defines the base surface upon which the concrete mixture is conveyed.

The method may further include the step of forming the concrete mixture by adding aggregates to the concrete mixture prior to conveying the concrete mixture onto the base surface. Aggregate may alternatively be applied to the concrete mixture after the concrete mixture is conveyed onto the base surface.

The distressing portion of the irregular surface forming tool may be moveable relative to the gripping portion. The irregular surface forming tool may include a chain, which defines the gripping portion and distressing portion.

During each strike of the irregular surface forming tool, at least a portion of the distressing portion may be advanced into the exposed surface to leave an imprint of the distressing portion therein.

Finishing steps may be performed on the concrete structure, such as applying a retarder or pressure washing the irregular surface.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and detailed description to indicate like elements.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 5:
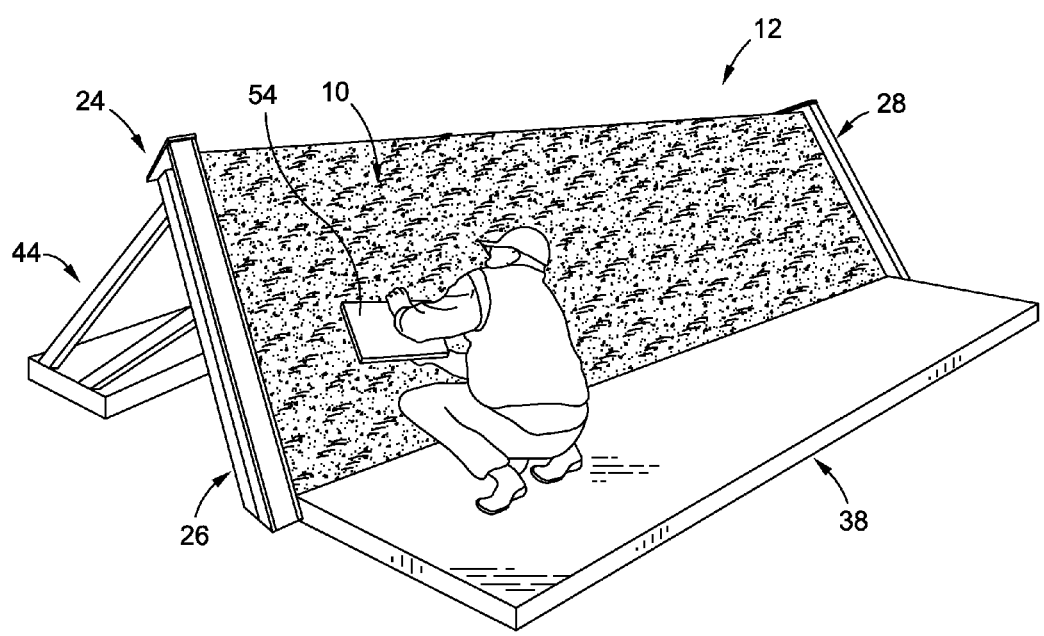
FIG. 5 is an upper perspective view of the irregular surface formed throughout the architectural concrete wall.

Referring now to the drawings, there is shown a method of forming an irregular aesthetic surface 10 (see FIGS. 5-6) on an architectural concrete wall 12 (see FIG. 5). According to various aspects of the present invention, the architectural concrete wall 12 is formed from a concrete mixture 14 (see FIG. 2), such as Shotcrete, Gunite, or similar concrete product. The concrete mixture 14 is conveyed, preferably via pneumatic means, onto a base surface 16 (see FIGS. 1 and 2) such that the concrete mixture 14 defines an exposed surface 18. An irregular surface forming tool 20 is used to manipulate the exposed surface 18 so as to convert the generally smooth exposed surface 18 into an irregular aesthetic surface 22. The irregular surface forming tool 20 may be used to impart the irregular surface 10 throughout the entire exposed surface 18, or over selective portions thereof.

The irregular surface forming tool 20 may include a chain, strap, wire, cable or other tool which may be struck against the exposed surface 18 to impart the irregular texture therein. The exemplary embodiment shows the irregular surface forming tool 20 as a chain, and thus the term "chain" will be used herein, although those skilled in the art will recognize that the term "chain" herein refers to the strap, wire, cable, or other irregular surface forming tools known in the art.

Figure 1:
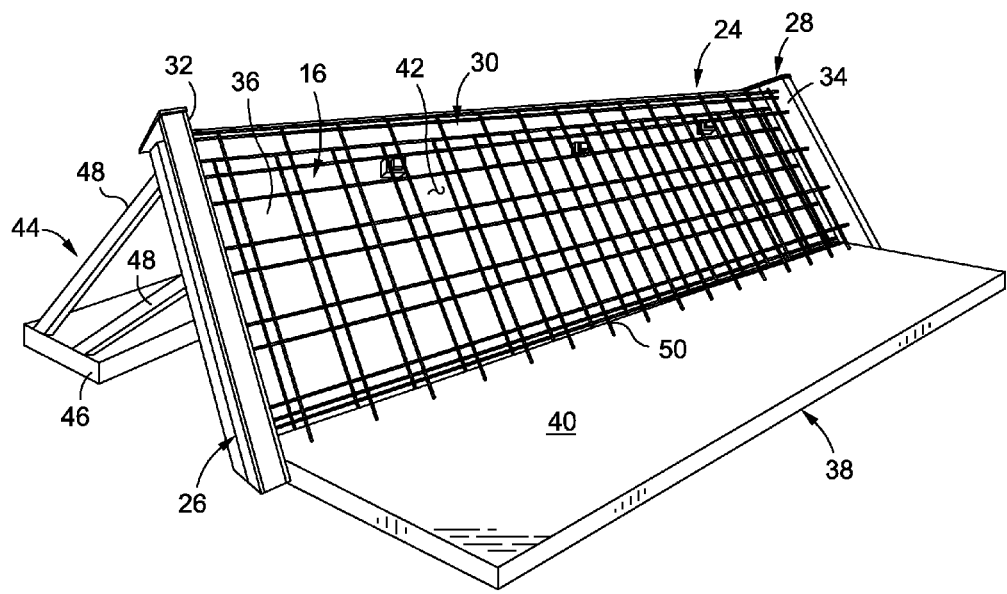
FIG. 1 is an upper perspective view of a back-form used to construct an architectural concrete wall.

Referring now specifically to FIG. 1, there is shown a back-form 24 used during construction of the architectural concrete wall 12. The exemplary back-form 24 includes a first side support member 26, a second side support member 28, and a rear support member 30 extending between the first and second side support members 26, 28. The back-form 24 may be formed from wood, or other similar materials known by those skilled in the art which are commonly used to shape and support concrete.

The first side support member 26 includes a first side surface 32, the second side support member 28 includes a second side surface 34 arranged in opposed relation to the first side surface 32, and the rear support member 30 includes a rear surface 36. The back-form 24 may also include a lower support member 38 having a lower surface 40. The first side surface 32, the second side surface 34, the rear surface 36, and the lower surface 40 collectively define the base surface 16, which in turn defines a cavity 42 within which the concrete mixture 14 is received for forming the architectural wall 12.

The cavity 40 includes a cavity length, "L," which is equal to the distance between the first side surface 32 and the second side surface 34, a cavity height, "H," which is equal to the distance from the lower surface 40 to the distal edge of the rear surface 35, and a cavity depth, "D," which is equal to the distance from the rear surface 36 to the distal edge of the first and/or second side surfaces 32, 34. The configuration of the exemplary cavity 42 defines a quadrangular shape, although those skilled in the art will readily appreciate that the back-form 24 may be configured to define a cavity 42 that defines other shapes, including custom shapes.

It is understood that the back-form 24 may be used to construct a generally vertical concrete wall 12 (i.e., wherein the exposed surface is generally perpendicular to the ground or parallel to the force of gravity). The exemplary embodiment depicted in the Figures shows the back-form 24 angled relative to the ground surface. In this regard, the back-form 24 may be generally perpendicular to the ground surface, or angled relative thereto, depending on the design of the wall 12. A support assembly 44 may be employed to support the back-form 24 at the raised or angled position. The support assembly 44 may include a foot member 46 disposable on the ground, and a support arm 48 connectable to the foot member 46 and the back-form 24.

The architectural concrete wall 12 may include a plurality of rebar members 50 internal to the wall 12 for providing structural support. The rebar members 12 may be disposed within the back-form cavity 42 and arranged in intersecting alignment to each other to define a lattice framework. The number of rebar members 50 used within the concrete wall 12 may vary depending on the size and shape of the concrete wall 12.

Figure 2:
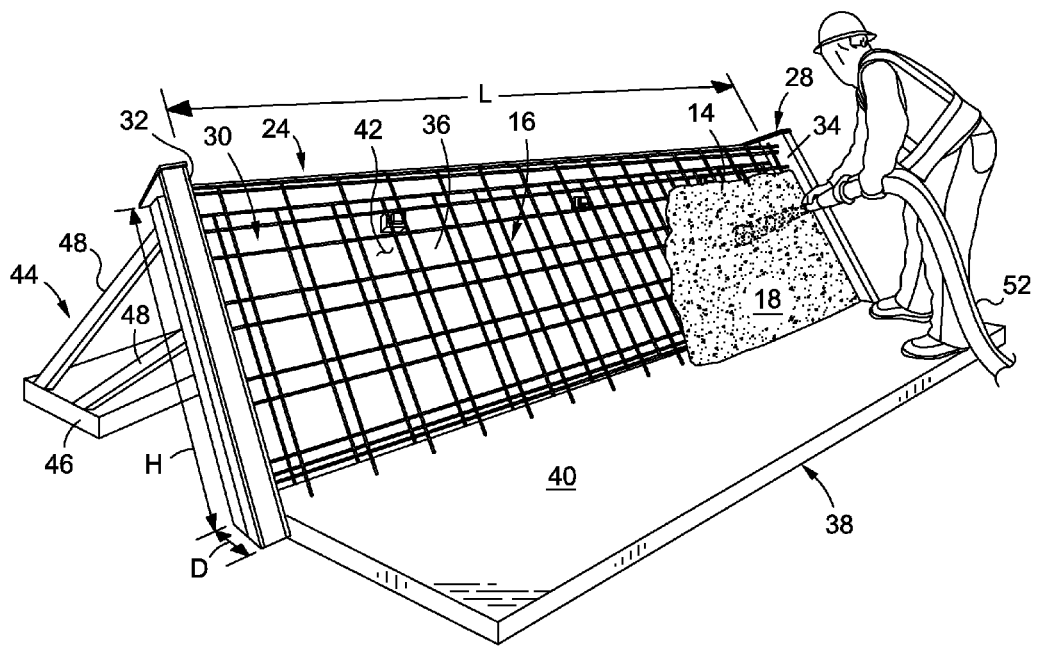
FIG. 2 is an upper perspective view of a concrete mixture being applied to the back form shown in FIG. 1.

The architectural concrete wall 12 is formed by spraying, conveying, pouring, projecting, or otherwise disposing the concrete mixture 14 within the back-form cavity 42. As shown in FIG. 2, an individual is conveying the concrete mixture 14 out of a hose 52 which is aimed toward the back-form cavity 42. Over time, the back-form cavity 42 will be filled with the concrete mixture 14. As the back-form cavity 42 is filled, the concrete mixture 14 encapsulates the rebar members 50.

The concrete mixture 14 is preferably formed from a material capable of being conveyed into the back-form cavity 42 via the hose 52, or similar pneumatic projection technique, wherein the concrete mixture 14 includes a stiffness or rigidity which allows the concrete mixture 14 to remain in the back-form cavity 42 despite it being raised or elevated at an angle to the ground. In this regard, the concrete mixture 14 is preferably low slump concrete which does not flow out of the cavity 42 after being conveyed therein. Exemplary concrete mixtures include Gunite, Shotcrete, or other mixtures known by those skilled in the art.

Although the Figures depict a cavity 42 and corresponding base surface 16 which is defined by the back form 24, it is also contemplated that other embodiments of the present method may relate to the formation of a concrete wall 12 independent of a back form 42. In this regard, the base surface 16 is not necessarily defined by the back form, and instead, may be defined by another support structure. For instance, the architectural wall 12 may part of an in-ground pool. In that case, the base surface 16 and cavity 42 may be defined by the ground or another foundation upon which the concrete mixture is conveyed.

Figure 3:
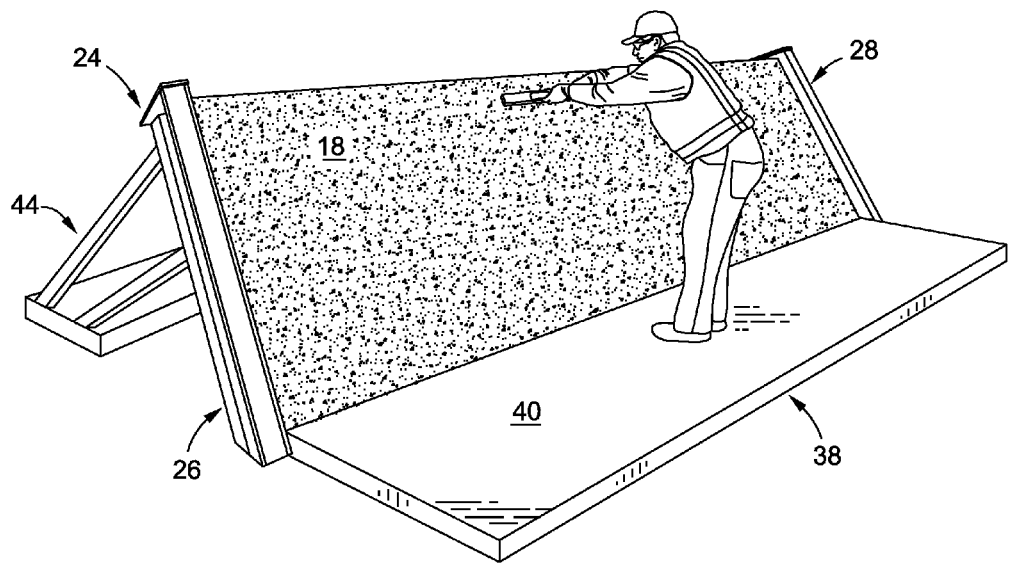
FIG. 3 is an upper perspective view of an individual creating a smooth exterior surface on the concrete mixture.

Referring now specifically to FIG. 3, the concrete mixture 14 disposed within the cavity 42 defines an exposed surface 18. After the cavity 42 is filled, the exposed surface 18 may be floated with a float to define a smooth uniform surface. Preferably, the entire exposed surface 18 of the concrete mixture 14 is floated, although only portions thereof may be floated without departing from the spirit and scope of the present invention.

Figure 4:
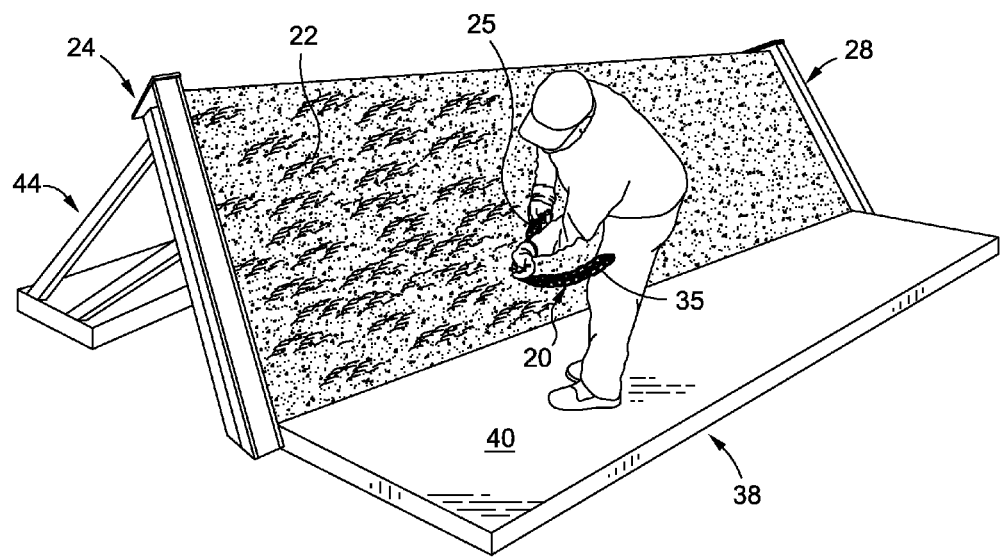
FIG. 4 is an upper perspective view of the individual utilizing an irregular surface forming tool to impart an irregular surface within the concrete mixture.

Referring now to FIG. 4, the formation of the irregular surface 10 upon the concrete wall 12 is shown. The irregular surface 10 may be formed with a chain 20 which is used to repeatedly strike the exposed surface at various locations throughout the exposed surface 18 to define the irregular surface 10.

In the exemplary embodiment shown in FIG. 4, the chain 20 is of a suitable mass to impart the irregular configuration within the external surface of the concrete mixture 14. The separate links of the chain 20 form an irregular, undulating surface when the chain 20 strikes the concrete mixture 14. The chain 20 is used by gripping one end of the chain and whipping the free end of the chain toward the concrete mixture 14. The portion of the chain 20 being held by the user is referred to as the gripping portion 25, while the free end of the chain 20 used to strike the concrete mixture is referred to as the distressing portion 35.

As the distressing portion 35 strikes the concrete mixture 14, the momentum of the chain 20 urges the distressing portion 35 of the tool 20 into the concrete mixture 14. The concrete mixture 14 preferably defines a hardness such that the distressing portion 35 of the chain 20 falls away from the concrete mixture 14 after imparting the irregular configuration therein. In other words, it is preferred that the distressing portion 35 does not become embedded within the concrete mixture 14. It is further preferable that the concrete mixture 14 defines a workability that allows the irregular surface 10 to be formed by advancement of the distressing portion 35 into the concrete mixture 14 rather than having the irregular surface 10 formed via braking or crumbling of the concrete mixture 14.

According to one embodiment, the distressing portion 35 may pivot or rotate relative to the gripping portion 25 to allow the distressing portion 35 to strike the concrete mixture 14. In the exemplary embodiment, the distressing portion 35 pivots about the individual's hand gripping the chain 20. In this regard, the individual may selectively control the length of the distressing portion 35 and the gripping portion 25 by selectively placing his hand along the length of the chain. By changing the length of the distressing portion 35, the individual may modify the size and shape of the depressions/cavities formed within the concrete mixture 14.

Furthermore, the number of depressions/cavities formed within the concrete mixture 14 may be controlled by the individual using the chain 20. In this regard, the individual using the chain 20 may control the number of times the chain 20 strikes the concrete mixture 14. Therefore, if the desired architectural look includes several depressions/cavities, then the chain 20 may be used to strike the concrete mixture 14 several times. Conversely, if only a few depressions/cavities are needed to achieve the desired look, then the concrete mixture 14 may be struck fewer times with the chain 20.

Referring now specifically to FIG. 5, there is shown an individual pressing a stamp 54 against the concrete mixture 14 after the depressions are formed therein by the irregular surface forming tool 20. The stamp 54 may include a stamping surface which is pressed against the exterior surface of the wall 12 to impart the texture of the stamping surface onto the exterior surface of the wall 12. In this regard, the stamping surface may define a more refined texture which may be imparted into the wall 12 after the chain 20 is used to impart the deeper depressions therein.

It is also understood that that when the chain 20 is advanced into the concrete mixture 14, the chain 20 may not only form a depression within the concrete mixture 14, but the advancement of the chain 20 into the concrete mixture 14 may cause portions of the concrete mixture 14 to flow out around the chain 20 and create bumps around the depression. These bumps may be undesirable, and thus, the stamp 54 may be used to press the bumps back into the concrete mixture 14 and to create a generally uniform, planar outer surface from which the depressions extend into the wall 12.

The use of the stamp 54 is optional, and may be used when needed to achieve a desired look or finish.

Figure 6:
FIG. 6 is an enlarged partial view of the irregular surface formed within the concrete wall.

Those skilled in the art will readily appreciate that it may be desirable to utilize an aggregate to enhance the appearance of the architectural concrete wall. FIG. 6 shows a section of an aesthetic surface 10 having aggregate formed therein. Along these lines, one embodiment includes a concrete mixture 14 having aggregate worked therein prior to spraying/conveying the concrete mixture 14 into the base form cavity 42. In this regard, the aggregate is preferably of a diameter or size which is small enough to pass through the hose 52 or other pneumatic discharge tool used to discharge the cement mixture 14 into the back-form cavity 42.

It is also contemplated that other embodiments of the method described herein may apply the aggregate to the exposed surface 18 of the concrete mixture 14 after the concrete mixture 14 is sprayed into the back-form cavity 42. The aggregate may be worked into the exposed surface 18 of the cement mixture 14 prior to working the cement mixture 14 with the irregular surface forming tool 20, and also preferably prior to floating the exposed surface 18 with a float.

The aggregate may include stones, pebbles, shells, glass fragments, brick fragments, tiles, or other similar aggregate materials commonly used in concrete products.

After the distressing procedures, a retarder can be applied to the surface of the concrete mixture and lightly broomed or brushed in. After a period of time, preferable two to twenty-four hours, the surface can be pressure washed, sandblasted, or etched to reveal the finished product.

Although the foregoing describes various embodiments of imparting a surface texture/design in a wall 12 formed just with a back-form, i.e., without a face form, it is also contemplated that other embodiments of the present invention include forming the surface texture/design in a concrete structure formed with a complete form, i.e., a form which includes a face form. For instance, concrete may be poured within a form which covers the face of the concrete structure. It is contemplated that the concrete poured within the form may define a higher slump than the Shotcrete or Gunite described above. After the concrete has partially set-up or hardened so as to enable removal of the face form without the concrete losing its shape, the face form is removed to expose the face of the concrete structure. With the face form exposed, the texture forming steps described above may now be performed on the concrete structure. In particular, the chain 20 may be repeatedly struck against the face of the concrete structure to create the depressions/cavities therein. The stamp 54 may also be used to impart the stamp design/texture into the irregular surface. Aggregate may be applied to the exterior surface, as desired. Furthermore, the finishing steps of applying a surface retarder, sandblasting or pressure washing may also be performed on the concrete structure.

The above description is given by way of example, and not limitation. Given the above disclosure, one skilled in the art could devise variations that are within the scope of the invention disclosed herein, including various ways of creating different textures, utilizing various types of surface forming tools, etc. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of forming an architectural concrete wall, the method comprising the steps of:
    conveying a concrete mixture onto a base surface, the concrete mixture defining an exposed surface, the base surface being inclined so that the exposed surface is angled relative to a horizontal plane;
    floating the exposed surface of the concrete mixture;
    gripping an elongate irregular surface forming tool having a gripping portion and a distressing portion defining an irregular configuration; and
    repeatedly striking the exposed surface at random locations with the distressing portion of the irregular surface forming tool to define an irregular surface, the striking of the exposed surface occurring while the concrete mixture is of a workable texture such that the striking does not result in breaking of the concrete mixture, wherein the irregular surface forming tool is flexible such that gravity causes the distressing portion to move relative to the gripping portion and fall away from the exposed surface between consecutive strikes.

2. The method recited in claim 1, wherein the projecting step includes pneumatically projecting the concrete mixture onto the base surface from a hose.

3. The method recited in claim 1, wherein the projecting step includes projecting Shotcrete onto the base surface.

4. The method recited in claim 1, further comprising the step of constructing a back-form, the back-form defining the base surface upon which the concrete mixture is projected.

5. The method recited in claim 1, further comprising the step of forming the concrete mixture by adding aggregates to a concrete substance prior to projecting the mixture onto the base surface.

6. The method recited in claim 1, wherein the providing step includes providing a chain, the chain defining the gripping portion and the distressing portion.

7. The method recited in claim 1, wherein during each strike of the irregular surface forming tool onto the exposed surface, at least a portion of the distressing portion of the irregular surface forming tool is advanced into the exposed surface to leave an imprint of the distressing portion therein.

8. The method recited in claim 1, further comprising the steps of:
    providing a stamp; and
    pressing the stamp against the irregular surface to impart a stamp texture into the irregular surface.

9. The method recited in claim 1, further comprising the step of applying aggregate to the concrete mixture after the concrete mixture is projected onto the base surface.

10. The method recited in claim 1, further comprising the step of applying a retarder to the irregular surface.

11. The method recited in claim 1, further comprising the step of pressure washing the irregular surface.

12. A method of forming an architectural concrete wall, the method comprising the steps of:
    conveying a concrete mixture onto a base surface, the concrete mixture defining an exposed surface, the base surface being inclined so that the exposed surface is angled relative to a horizontal plane;
    floating the concrete mixture;
    striking the exposed surface with an irregular surface forming tool to define an irregular surface, the striking of the exposed surface occurring while the concrete mixture is of a workable texture such that the striking does not result in breaking of the concrete mixture, wherein at least a portion of the irregular surface forming tool falls away from the exposed surface between consecutive strikes; and
    pressing a stamp against the irregular surface to impart a stamp texture in the irregular surface.

13. The method recited in claim 12, wherein the projecting step includes pneumatically projecting the concrete mixture onto the base surface from a hose.

14. The method recited in claim 12, wherein the projecting step includes projecting Shotcrete onto the base surface.

15. The method recited in claim 12, further comprising the step of constructing a back-form, the back-form defining the base surface upon which the concrete mixture is projected.

16. The method recited in claim 12, further comprising the step of forming the concrete mixture by adding aggregates to a concrete substance prior to projecting the mixture onto the base surface.

17. The method recited in claim 12, wherein during each strike of the irregular surface forming tool onto the exposed surface, at least a portion of the irregular surface forming tool is advanced into the exposed surface to leave an imprint therein.

18. The method recited in claim 12, further comprising the step of applying aggregate to the concrete mixture after the concrete mixture is projected onto the base surface.

19. The method recited in claim 12, further comprising the step of applying a retarder to the irregular surface.

20. A method of forming an architectural concrete wall, the method comprising the steps of:
    conveying a concrete mixture onto a base surface, the concrete mixture defining an exposed surface, the base surface being inclined so that the exposed surface is angled relative to a horizontal plane;
    floating the exposed surface of the concrete mixture;
    gripping an elongate irregular surface forming tool having a gripping portion and a distressing portion defining an irregular configuration; and repeatedly striking the exposed surface at random locations with the distressing portion of the irregular surface forming tool to define an irregular surface, the striking of the exposed surface occurring while the concrete mixture is of a workable texture such that the striking does not result in breaking of the concrete mixture.

\* \* \* \* \*